No. 761,212. PATENTED MAY 31, 1904.
J. DUNNE.
COMMERCIAL SECURITIES.
APPLICATION FILED MAR. 30, 1904.
NO MODEL. 3 SHEETS—SHEET 1.

*Fig. 1.*

BLANK MANUFACTURING COMPANY,
219 Franklin Street.
New York, January 10th, 1904.

Messrs. A. B. & Co.,
775-779 Sixth Avenue N.Y.

Gentlemen:—

We beg to hand you herewith Invoice No. 1050 of goods sold you under date of January 7, 1904 amounting to $9,450. Having checked off the goods received thereunder, and having found the same and the conditions, prices and terms correct as stated, please sign and return confirmation blank, and duplicate invoice attached thereto, and oblige, Yours truly, BLANK MANUFACTURING COMPANY,
J. D., Treasurer.

New York, January 10th 1904.

BLANK MANUFACTURING COMPANY,
219 Franklin Street, N.Y.

Gentlemen:—

Invoice No. 1050 of goods sold us under date of January 7, 1904, amounting to $9,450 (duplicate hereto attached) is at hand. We have checked off the goods received by us thereunder, and note the conditions, prices and terms all of which we find correct.

A. B. & CO.,
775-779 Sixth Avenue, N.Y.

Witnesses
Edward Rowland
Florence Pick

James Dunne Inventor
By his Attorney H. S. Mackay

No. 761,212. PATENTED MAY 31, 1904.
J. DUNNE.
COMMERCIAL SECURITIES.
APPLICATION FILED MAR. 30, 1904.
NO MODEL. 3 SHEETS—SHEET 2.

*Fig. 2.*

No claims for damages, shortage, inferiority of goods to sample shown, or errors in price, will be allowed unless made within 10 days after receipt of goods.
When writing concerning goods refer to number and date of invoice.

New York, January 7, 1904.

Messrs. A. B. & Co.
    775-779 Sixth Avenue, New York,

Bought of BLANK MANUFACTURING COMPANY,
        219 Franklin Street.

Salesman, _____
Invoice, _____
Book, _____ Folio _____
Insured, _____
Shipped via. _____

No _____

Terms;
Payable in New York City Funds.

| | | | | |
|---|---|---|---|---|
| 500 yds. F. & C. Flannels, | Red, | 35 c, | 1750.00 |
| 500 Yds. " " | Blue, | 35 c, | 1750.00 |
| 700 Yds. " " | White, | 35 c, | 2450.00 |
| 1000 Yds. " " | Navy Blue, | 35 c, | 3500.00 |
| | | | $9450.00 |

Witnesses
Edward Rowland
Florence Pick

James Dunne Inventor
By his Attorney H. S. Mackaye

No. 761,212. PATENTED MAY 31, 1904.
J. DUNNE.
COMMERCIAL SECURITIES.
APPLICATION FILED MAR. 30, 1904.

NO MODEL. 3 SHEETS—SHEET 3.

*Fig. 3.*

Know all Men by these Presents, that under and pursuant to the authority duly granted by its Board of Directors, The Blank Manufacturing Company, a corporation duly incorporated, organized and existing under the Laws of the State of New Jersey, *for value received* (1) has sold, assigned, transferred and set over, and by these presents, hereby does sell, assign, transfer and set over unto The C.D. Finance Corporation, No. 350 Broadway, New York City, its successors and assigns, all and singular its right, title and interest in and to the sales account (Invoice No. 1050) for goods sold and delivered unto A.B. & Co., 777-779 Sixth Avenue, New York City (hereto annexed, forming part hereof, and marked Ex.A.) (2) has guaranteed, and by these presents hereby does guarantee the prompt payment thereof when same falls due, in accordance with the terms and conditions of sale; and (3) has authorized, and by these presents hereby does authorize The C.D. Finance Corporation, its successors or assigns, if necessary so to do, in the name of said assignor company or otherwise, to demand, sue for, recover and enjoy all moneys due and to grow due on said sales account hereby assigned.

In Witness Whereof, the Blank Manufacturing Company has caused these presents to be executed by its duly authorized officers, and its corporate seal to be hereunto affixed, this 10th day of January 1904.

[SEAL] BLANK MANUFACTURING COMPANY,
By J.D., *Treasurer.*

For Value Received, (being hereto duly authorized by its Board of Directors,) The C.D. Finance Corporation hereby assigns, transfers and sets over unto the Universal Trust Company, 79 Wall Street New York City, all and singular its right, title and interest in and to the sales account (Invoice No. 1050) mentioned and described in the foregoing assignment, and for a like consideration, hereby guarantees the payment of such account when due in accordance with the terms and conditions of the sale.

In Witness Whereof, The C.D. Finance Corporation has caused these presents to be executed by its duly authorized officers, and its corporate seal to be hereunto affixed, this 10th day of January, 1904.

[SEAL] THE C.D. FINANCE CORPORATION,
By A.B. *Treasurer.*

Witnesses
Edward Rowland,
Florence Pick.

James Dunne Inventor
By his Attorney H.S. Mackaye

No. 761,212. Patented May 31, 1904.

UNITED STATES PATENT OFFICE.

JAMES DUNNE, OF NEW YORK, N. Y.

COMMERCIAL SECURITY.

SPECIFICATION forming part of Letters Patent No. 761,212, dated May 31, 1904.

Application filed March 30, 1904. Serial No. 200,720. (No specimens.)

*To all whom it may concern:*

Be it known that I, JAMES DUNNE, a citizen of the United States, residing in the city, county, and State of New York, have invented a certain new and useful Improvement in Commercial Securities, of which the following is a specification.

This invention has relation to a substitute for three-name negotiable paper, by the use of which a merchant can quickly and easily obtain cash on an open account, while at the same time the lender of money is fully secured.

One advantage of the improved means hereinafter described is that it involves no directions or order for payment by the purchaser to a bank. The merchant is thus screened, and the fact of his asking for a loan is kept secret.

Another advantage of this improvement is that its use involves a receipt and the creation of a written contract on the part of the buyer that he will pay.

The preferred form taken by the improvement in question is shown in the accompanying drawings, wherein—

Figure 1 shows a specimen of the confirmation-blank with the letter of transmittal preferably accompanying the same. Fig. 2 is a specimen invoice or bill forming a part of this improved means, and Fig. 3 is a specimen assignment and reassignment as used to complete the commercial security for money loaned.

In the transaction supposed to be carried out by the papers shown in the drawings the Blank Manufacturing Company has sold to "A B & Co." goods to the value of nine thousand four hundred and fifty dollars. For this an invoice (shown at 1) is sent to the purchaser and a duplicate is preferably sent with it, as is indicated by the terms of the letter of transmittal, (shown at 2 in Fig. 1.) Together with the invoice there is sent a voucher or "confirmation-blank," (shown at 3 in Fig. 1,) which after signature by the purchaser "A B & Co." becomes an acknowledgment of receipt and indebtedness, to a great extent equivalent to a promissory note. The invoice is checked off by the purchaser in conformity with the letter of transmittal, and if found correct the duplicate is returned with the confirmation-blank, the latter having been duly signed. The original invoice is kept by the purchaser, and I prefer to also supply a duplicate confirmation-blank as well to be retained by the purchaser for his own information. It is to be observed that none of these papers contain any authorization or order for payment by the purchaser to a trust company or bank. Thus the seller can either use the open account for securing a loan, as hereinafter described, or not, as he pleases. Moreover, there is no intimation to the buyer or others that the seller is embarrassed at all.

The third element of this device consists of the assignment-blank. (Shown in Fig. 3.) This includes the first assignment, (shown at 4,) wherein the seller assigns all right to payment by the purchaser to a "finance corporation" and wherein the seller further guarantees payment by said purchaser. Preferably (but not essentially) on the same paper with this first assignment there is placed a second assignment 5 or "reassignment," wherein the finance corporation assigns the account to a trust company or bank and guarantees payment of the amount. It will be seen that by the use of the above-described means the bank holds as security what is the virtual equivalent of a three-name promissory note. The confirmation-blank duly signed is an original promise to pay and acknowledgment that no defense to the claim exists. The first assignment makes the seller, Blank Manufacturing Company, a guarantor and the reassignment adds the guarantee of a third name—that is, of the finance corporation. The seller and the finance corporation thus occupy the position of indorsers of a note.

What I claim is—

1. The herein-described commercial security comprising an invoice, a confirmation-blank acknowledging receipt and correctness of the invoice, an assignment to a finance corporation of the account, containing a guarantee by the seller of payment of the bill and a reassignment containing a like guarantee by the finance corporation, substantially as described.

2. The herein-described commercial security, comprising an invoice in duplicate, a confirmation-blank also in duplicate acknowledging receipt and correctness of the invoice, and a single paper containing an assignment and a reassignment, said assignment making over the account to a finance corporation and guaranteeing payment on the part of the seller and said reassignment making over said account to a lender and making a like guarantee on the part of the finance corporation.

JAMES DUNNE.

Witnesses:
H. S. MACKAYE,
FLORENCE PICK.